United States Patent [19]

DuVall

[11] 4,157,533

[45] Jun. 5, 1979

[54] INDEPENDENT CHANNEL AUTOMATIC GAIN CONTROL FOR SELF-SCANNING PHOTOCELL ARRAY

[75] Inventor: Dale R. DuVall, Keller, Tex.

[73] Assignee: Recognition Equipment Incorporated, Irving, Tex.

[21] Appl. No.: 854,955

[22] Filed: Nov. 25, 1977

[51] Int. Cl.² ............................................. G06K 9/12
[52] U.S. Cl. ......................... 340/146.3 AG; 250/567; 358/174
[58] Field of Search .............. 340/146.3 AG, 146.3 R; 250/567, 568; 358/282, 284, 174, 179

[56] References Cited

U.S. PATENT DOCUMENTS

| | | | |
|---|---|---|---|
| 3,568,151 | 3/1971 | Majima | 340/146.3 AG |
| 3,800,078 | 3/1974 | Cochran et al. | 340/146.3 AG |
| 3,872,434 | 3/1975 | Duvall et al. | 340/146.3 AG |
| 3,918,049 | 11/1975 | Snyder et al. | 340/146.3 AG |
| 3,962,681 | 6/1976 | Requa et al. | 240/146.3 AG |
| 4,064,484 | 12/1977 | Mese et al. | 340/146.3 AG |
| 4,128,830 | 12/1978 | Weythman | 340/146.3 AG |
| 4,129,853 | 12/1978 | Althauser et al. | 340/146.3 AG |

Primary Examiner—Leo H. Boudreau
Attorney, Agent, or Firm—John E. Vandigriff

[57] ABSTRACT

A scanned photocell array has the gain for each photocell channel automatically controlled by establishing a scale range based upon the media being scanned. The apparent gain of each cell is varied by modulating the reference input of an analog to digital converter at the photocell scan rate.

9 Claims, 5 Drawing Figures

INDEPENDENT CHANNEL AUTOMATIC GAIN CONTROL FOR SELF-SCANNING PHOTOCELL ARRAY

FIELD OF THE INVENTION

This invention relates to character recognition systems and more particular to an independent channel automatic gain control for a self-scanning photocell array.

BACKGROUND OF THE INVENTION

In an optical character recognition system it is desirable to provide a data lift where each individual photocell of an array of photocells establishes its scale range based upon the reflectance of the media currently being scanned. Since the media can be multi-colored or have varying levels of background reflectance, it is desirable to scale each individual photocell between the reflectance it is currently observing and black resulting in different scale ranges of photocells in the proximity of one another.

PRIOR ART

In optical data lift systems employing discrete or independent photocells, individual amplifiers associated with single photocells provide automatic gain control utilizing well known analog techniques. In newer systems utilizing self-scanning photocells, in particular a multitude of photocell outputs sequentially on a single line, one video amplifier is normally used for a group of photocells. Because of this, it is not practical for a single video amplifier to provide gain control for individual photocells. A technique for modifying the scale ranges of individual photocell output on a single line is described in U.S. Pat. No. 3,872,434. However, in this previously described system, the scale factors are established for each photocell while a photocell views a target of uniform reflectance. While actually scanning information, the scale factors are varied proportionally to one another to provide gain variation due to background. The photocell gains are not independently varied.

SUMMARY OF THE INVENTION

The present invention describes a technique by which the effective gains of individual photocells can be varied independently as required. The apparent gain of each photocell is varied by modulating the reference input of an anlog to digital converter at the photocell input rate. A reference value for each photocell is stored in a digital memory and is used to vary the reference input of a digital to analog converter. The reference value for each photocell is compared to the output level of the photocell each scan so that the reference value can be modified as required, thus providing automatic gain control for each photocell.

The unique features and technical advance represented by the present invention will become apparent in the following detailed description when taken in conjunction with the appended claims and the drawings identified below.

DESCRIPTION OF THE INVENTION

Figure 1:
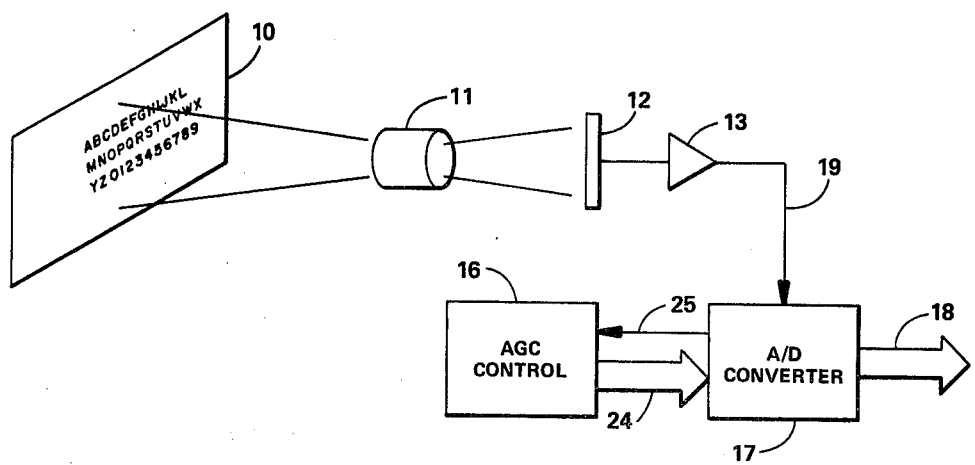
FIG. 1 illustrates the scanning system with the AGC control attached.

Referring to FIG. 1 there is illustrated an overall diagram of a system utilizing the present invention. For example, a document 10 having data thereon is scanned by self-scanning array 12 through a lens 11. The data from the array is passed through a video amplifier 13 and then fed by line 19 to the analog to digital converter 17. The AGC control 16 receives data by line 25 and provides a reference signal on line 24 to the analog to digital converter 17.

The self-scanning photocell array 12 may have, for example, 32 photocells which produce an output on a single output line. The output of the array is routed through the amplifier 13. The output of the amplifier is a serial voltage representative of the reflectance observed by the photocells as they are scanned. The output of the amplifier is routed to the analog to digital converter 17 where the automatic gain control analog reference signal is generated and used to modulate the input to the A/D converter 17 reference input. The A/D converter provides a parallel conversion technique to provide 4 bits (16 gray levels) resolution of the gray scale. This voltage conversion technique is well known.

Figure 2:
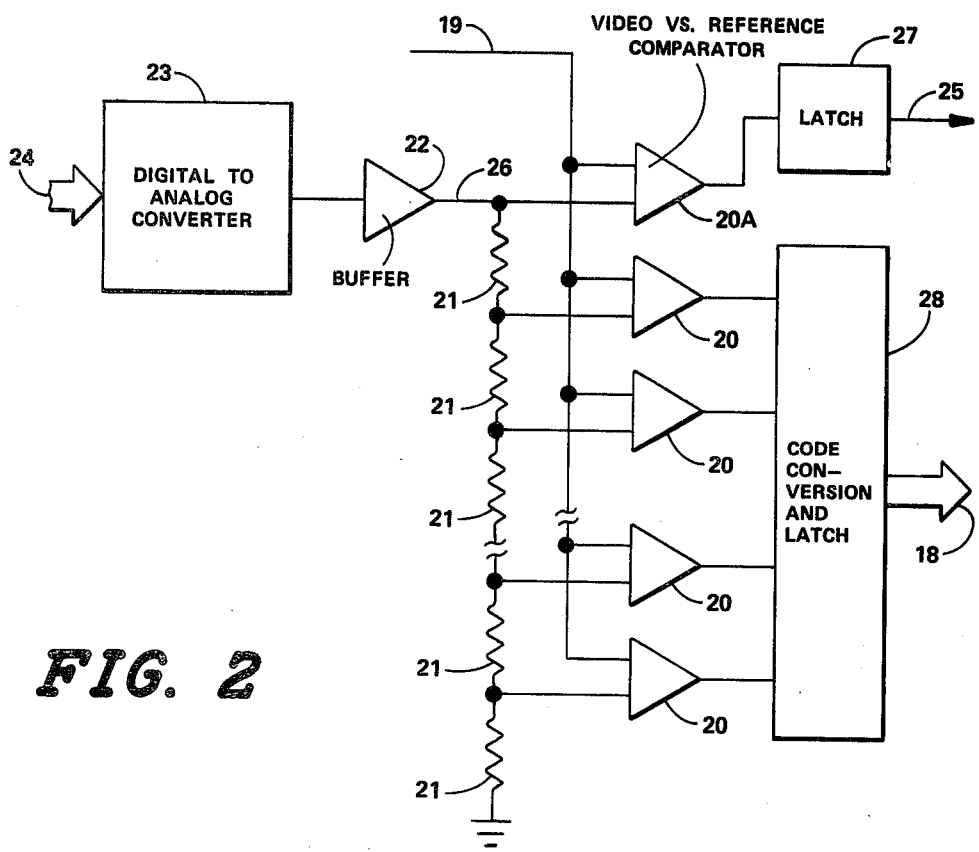
FIG. 2 is a more detailed illustration of a digital to analog converter and a video reference comparator circuit utilized in the invention.

The voltage ladder, illustrated in FIG. 2 and represented by resistors 21, receives the output of a digital to analog converter 23 in the AGC system. The output of the D/A converter is isolated from the voltage ladder by buffer amplifier 22. The comparison takes place when the input signal 19 and the reference signal from the AGC circuit is compared in the video vs. reference comparators 20. The operation of the A/D coverter 17 is distinct in that the reference voltage of the converter is generated by a digital to analog converter instead of a precision voltage source normally found in this type of A/D converter. An additional comparator, 20A is used by the control circuit (which provides a digital value to the converter) to determine when and in what direction the reference should be modified. The reference modification algorithm used is based upon the following assumptions: (1) The video background levels (and thus the input video level) are greater than the information levels (normally darker printing). (2) If the input video level is greater than the reference, this indicates that the reference is too low. (3) If the input video level is less than the reference for short intervals, information is being viewed. If the video level is less than the reference for an extended interval, this indicates that the reference is too high.

Utilizing these assumptions, the following controls are provided in the system: (1) If the video level for any individual photocell exceeds a reference for the two successive scans, the reference should be increased a single increment typically 2%. If this condition remains for subsequent scans the reference is subsequently increased once per scan until it exceeds the video or until a predetermined maximum value is reached (not a normal occurence). (2) If the reference level exceeds the video level for twelve successive scans, the reference level is reduced. If this condition remains for subsequent scans, the reference is subsequently reduced once per scan until it is below the video level or until a predetermined minimum value is reached (a normal condition between documents).

The exact characteristics of the controls such as delays before increasing or decreasing the referene, and the magnitude of the incremental changes can be altered to optimize system performance and remain within the scope of the invention. It should be noted that increasing and decreasing are analogous to attacking and releasing, respectively, normally associated with analog circuitry.

Figure 3:
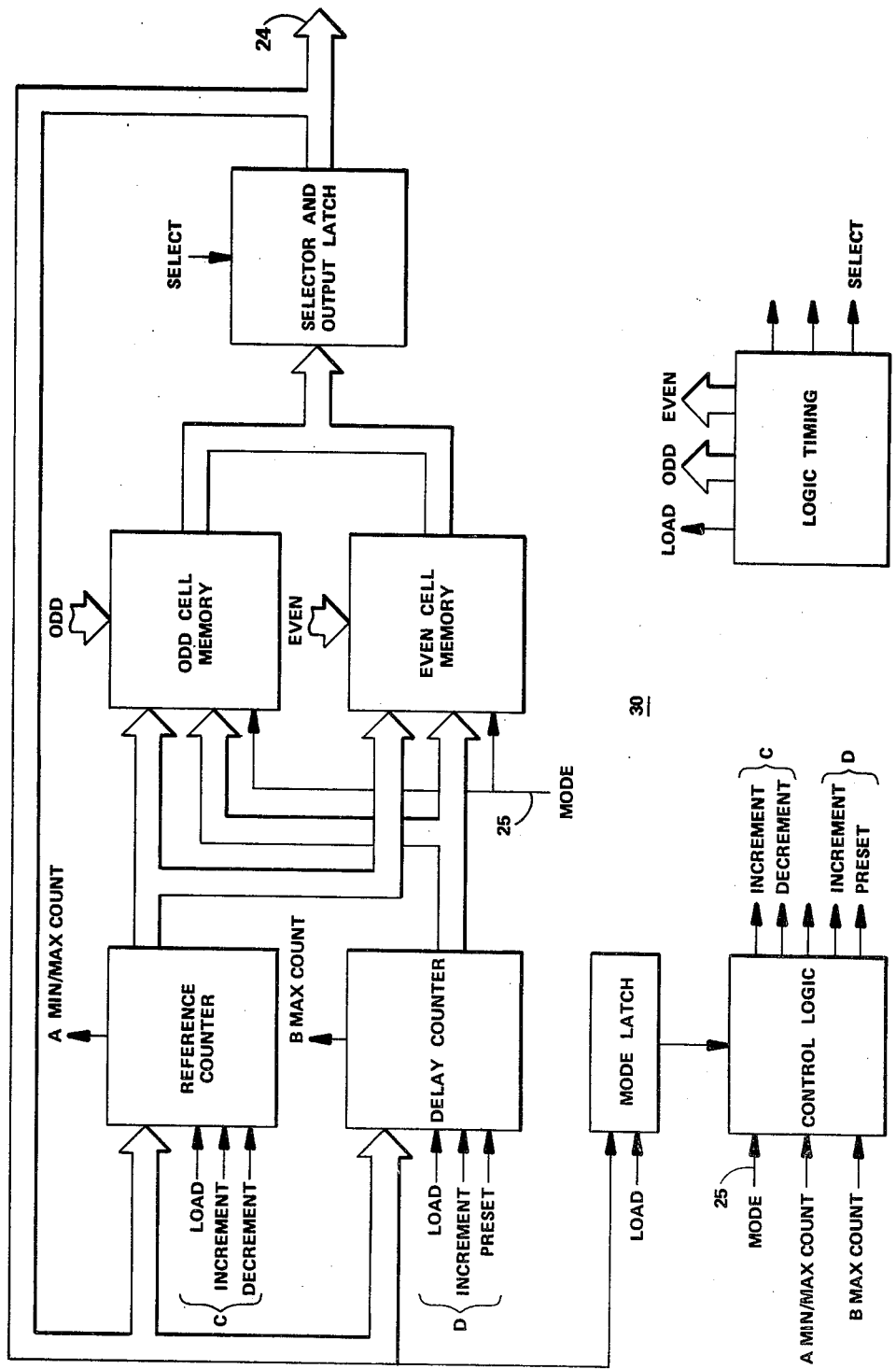
FIG. 3 is a block diagram of a portion of the AGC control circuit.

A circuit providing the above mentioned controls may be, for example, that shown in FIG. 3. In FIG. 3 the Delay counter (an up counter) provides a delay before increasing or decreasing the reference by counting the number of successive times the video level for each photocell exceeds or is less than the reference signal level. The delay counter is typically a 4-bit binary counter with parallel loading capability. Its outputs are decoded to provide the maximum count signal. The parallel load capability is utilized both for loading the previous delay count or for presetting to a predetermined count representative of the desired delays.

Connected to the Delay Counter is the Reference counter which is an up/down counter used to modify the current reference if the prescribe conditions for modifying the reference are met. Th reference counter typically can be a 5-bit binary counter with parallel loading capability. Its outputs are decoded to provide the min/max signals used by the control logic. Using a 5-bit binary counter provides 32 monotonic levels of background reference between its upper and lower limits.

There are two memory circuits, The first is the Odd-cell memory which interconnects the Reference counter and the Delay counter. This memory contains the reference value, the delay count and the level mode (reference versus video level comparison) for photocells 1, 3, 5, 7, etc. determined during the previous scan. Also connected to the Delay counter, the Reference counter and the Odd-cell memory is the Even-cell memory. It has the same function as the Odd-cell memory except it stores the above mentioned data for photocells 2, 4, 6, 8, etc. At this point it should be noted that when the mode signal is a logic "1", this is an indication that the video level exceeds the Reference level.

The Mode Latch circuit is used to control the control logic. The Mode Latch stores the mode for the previous scan for comparison to the mode of the present scan.

The Control Logic circuit generates necessary controls for the counters based on the delay count, the current and previous mode signals and present reference values. As indicated, the Control Logic circuit is interconnected by lines C to the Reference counter and by the way of lines D to the Delay counter. Inputs to the Control Logic circuit are the mode, the min/max count and the max count signals. The min/max count is derived from the Reference counter and the max count from the Delay counter. The min/max count is logically true when the Reference counter has a maximum or minimum value in it (11111 or 00000) the maximum count is logically true when at its maximum count (1111).

Controlling or providing signals to the system is the Logic Timing circuit which provides a clock pulse for the counters, memory read and write pulses and memory addressing. This timing is in synchronization with the video scan rate and is run continuously. A timing example is explained later in reference to FIG. 4. As illustrated, the Logic Timing circuit provides a Load signal to the Reference counter and the Delay counter, and is interconnected with the Odd-and Even-cell memories. The Select signal from the Logic Timing circuit is sent to the Selector and Output Latch circuit which takes the outputs of the Odd-and Even-cell memories to provide a signal which is routed back to the Delay and Reference counters and the comparator illustrated in FIG. 2.

The Logic Control for the AGC circuitry provides counter controls (Odd and Even) based on the following circumstances: The Delay Counter increments when the Delay Counter is not at its maximum count and the previous mode is the same as the current mode; the Delay Counter is preset when the previous mode is not the same as the current mode; the Reference Counter is incremented when the Delay Counter is at its maximum count and the previous mode is the same as the current mode and is a logic "1", and the reference counter is not at its maximum count; and, the Reference Counter is decremented when the Delay Counter is at its maximum count and the previous mode is the same as the current mode and both are at a logic "0", and the Reference Counter is not at its minimum count.

Figure 4:
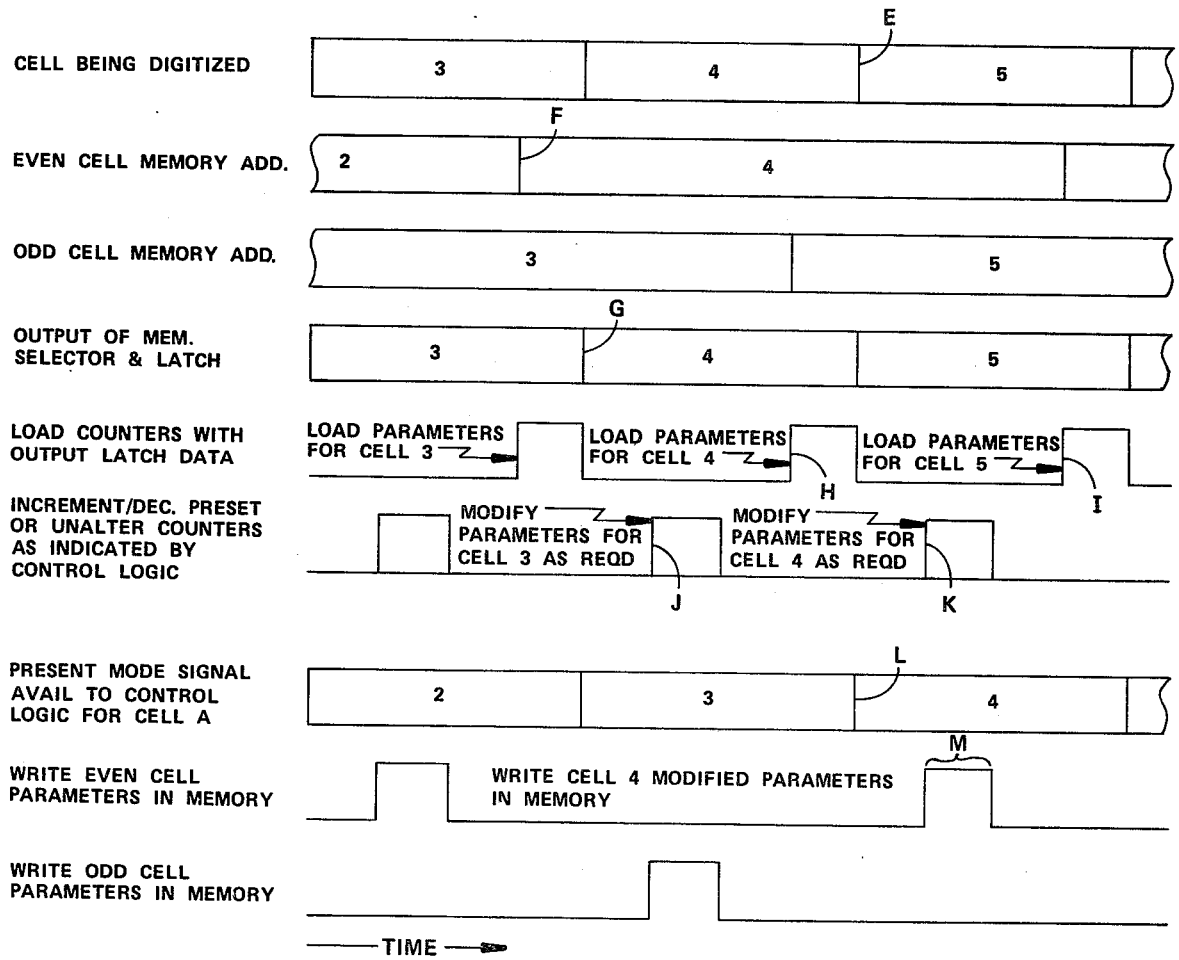
FIG. 4 is a timing diagram representative of the operation of the AGC circuit.

The operation of the AGC can be explained utilizing the timing diagram of FIG. 4 and the Logic Control function set forth above. For example, consider cell number 4 while cell number 3 is still being digitized by the A/D counter, The Even-cell memory address accessed the parameters for cell 4 beginning at point F. The parameters include the reference value and delay for cell number 4 as it was modified the previous scan, and the mode of the cell the previous scan. The memory output latch clocks these accessed parameters at point G. The reference value for cell number 4 is thus routed to the A/D converter concurrently with the routing of cell number 4 to the A/D converter. At the same time the cell number 4 parameters are routed to their respective counters and latch. At this point H these parameters are loaded into these counters and then latched. At the end of the A/D conversion cycle for cell number 4 (point E), the mode of cell 4 is latched at latch 27 beginning at point L and routed to the AGC circuit line 75. At point K, the counters are modified or left unchanged, based upon the previously described control equations. During the interval M, the modified control parameters are loaded into memory for use the next consecutive scan. Each successive cell has its control parameters selected and modified in the same manner. This process continues on a scan by scan basis continually modifying a reference as required so that the reference will represent the full scale range of its respective photocell regardless of reflectance.

Figure 5:
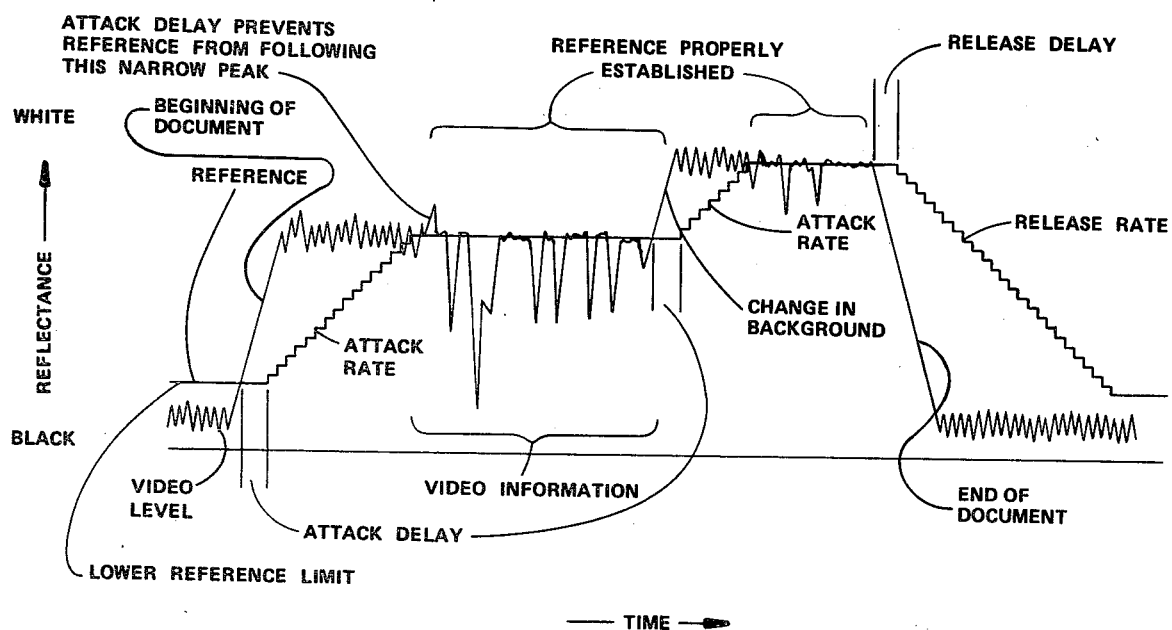
FIG. 5 is a diagram illustrating the video level versus reference level for a typical video channel.

An illustration of video level versus reference level for a typical video channel is illustrated in FIG. 5. This plot is based on a reference of Time versus Reflectance. It should be noted that the reference line starts at the lowest reference limit. As a document is viewed, the video level increases, resulting in the AGC circuitry delaying and then attacking which brings the reference level up to the vicinity of the video level. However, there is an attack delay which prevents the reference from following narrow peaks or sudden temporary changes in reflectance. Where there is video information the reference levels are properly established taking into consideration the time delay. As illustrated there is attack delay in two portions of the curve where the basic video information changes. However, at the end of the document the video reference for each cell decreases at a release rate delay so that the reference level decrements down to the lower reference level. It should be noted that in the reflectance curve the reference ranges from black up to white. White represents the background of the document being read and that black represents the printing information being read from the document or no document present. Short excursions into the black direction wherein the scan crosses a black numeral does not interfere with the reference level since the attack delay prevent these short pulses of black from altering the basic reference level. It is only the background information which are observed for longer periods of time which can alter the reference level based upon the actual reflectance of the background color, or amount of reflectance of the document itself and not the printing thereon.

While a specific example has been shown illustrating one preferred embodiment of the invention modifications may be made without departing from the true scope of the invention.

What is claimed is:

1. A control circuit for automatically independently controlling the effective gain of each photocell in a scanned array of photocells comprising; means for storing a digital reference gain value for each photocell each time the photocell is scanned, said value based upon the output of a photocell of a previous scan and means for independently varying the apparent gain of each photocell based upon the stored reference gain value.

2. The circuits according to claim 1 wherein the means for varying the apparent gain of each photocell includes an analog to digital converter.

3. The circuit according to claim 2 wherein the analog to digital converter has a reference input and the reference input is modulated at the photocell scan rate.

4. An automatic gain control circuit for varying the gain from one scan to another of each photocell in a scanned array of photocells comprising; means for sequentially comparing with a reference value, the video output of each photocell as it is scanned, means for storing the results of the comparison and generating a new reference value each time the photocell is scanned, means for delaying the reference value for at least one scan and means for adjusting the apparent gain of each photocell after said delay in accordance with the new reference value when the video output of a photocell is less than or exceeds the reference value for a predetermined number of successive scans.

5. The control circuit according to claim 4 including means for storing the reference value in digital form and converting it to analog form when it is compared with the photocell video signal, and when it is used to adjust the apparent gain of each photocell.

6. The control circuit according to claim 4 including means for applying the reference value to means for adjusting the apparent gain at the scan rate of the array.

7. A control circuit for compensating gain difference in individual photocells in an array of scanned photocells and for adjusting apparent photocell gain to compensate for differences in reflectance of the media being scanned by the photocell array comprising; means for detecting a change in reflectance of the media being scanned for each scan of each photocell in said array, means for delaying gain compensation of each photocell for a predetermined period after detection in a change in reflectance, and means operable after said delay to increase or decrease gain to establish a gain compensation for each photocell corresponding to said reflectance change.

8. An apparatus for providing automatic gain control for each photocell in a multicell self-scanning array comprising; means for generating a sequential analog video signal representative of the output of each of the photocells, an automatic gain control circuit for generating a digital reference signal for each photocell, a digital to analog converter for changing each digital reference signal to an analog value, means for storing each of said reference signals, means for comparing the analog reference signals with the sequential analog signal on a cell by cell basis each time the photocell is scanned, and means for generating a digital value representative of each cell output signal independent of the other cell output signals adjusted in gain based upon the reference signal against which it is compared.

9. A method for individually compensating the gain of each photocell in an array of scanned photocells for reflectance changes in the media scanned by the photocells comprising the steps of; generating a reference signal for each photocell, comparing the video output of each photocell with the reference signal for that photocell, delaying the reference value for at least one scan, generating a new signal based on the comparison of the video signal and the delayed reference signal, storing the new signal, generating a new reference signal based on the new signal and adjusting the apparent gain of each photocell by using the new reference signal as a reference to modify the current output of the video signal of each photocell.

* * * * *